Nov. 4, 1952 E. H. HUGENHOLTZ 2,617,037
AUTOMATIC FREQUENCY CONTROL CIRCUIT
Filed Feb. 17, 1949
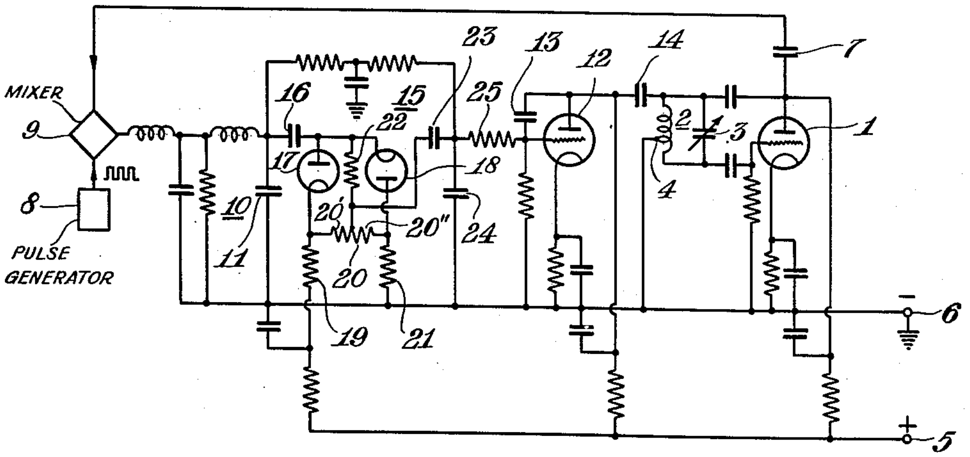
INVENTOR.
EDUARD HERMAN HUGENHOLTZ
BY Fred M Vogel
AGENT.

Patented Nov. 4, 1952

2,617,037

UNITED STATES PATENT OFFICE 2,617,037

AUTOMATIC FREQUENCY CONTROL CIRCUIT

Eduard Herman Hugenholtz, Eindhoven, Netherlands, assignor to Hartford National Bank and Trust Company, Hartford, Conn., as trustee Application February 17, 1949, Serial No. 76,976
In the Netherlands March 27, 1948

6 Claims. (Cl. 250—36)

This invention relates to a circuit-arrangement comprising an oscillator and provided with means for automatic frequency correction (A. F. C.) of the oscillations produced by the oscillator in accordance with a control-voltage which comprises direct and alternating voltages and is fed through a control-voltage channel to the A. F. C. means.

According to the invention the control-voltage channel in circuit-arrangements of the aforesaid type is constructed to be such that the ratio between its transmission factors for direct and alternating control-voltages increases with relatively equal, decreasing voltage amplitudes.

As usual the term "transmission factor" is to be understood to mean the ratio between the output and the input voltages.

With the use of the invention the influence of interfering alternating voltages occurring in the control-voltage channel and militating against stabilisation of the oscillator, is greatly reduced.

The control-voltage channel preferably comprises two branches connected in parallel on the input side and which comprise a low-pass filter and a transmission device locking direct voltages respectively, the transmission factor of the latter decreasing with a decrease in alternating input voltage.

In order that the invention may be more clearly understood and readily carried into effect, it will now be described more fully with reference to the accompanying drawing, in which the single figure shows a favourable form of the circuit-arrangement according to the invention.

In the drawing the reference numeral 1 designates a triode used as an oscillator tube, the anode and control-grid of which are connected respectively through coupling condensers, to the ends of a frequency determining oscillatory circuit 2 comprising a tuning condenser 3 and a coil 4. The cathode is earthed through a cathode resistance shunted by a condenser, and a mid-point tapping of coil 4 is likewise earthed. The anode of the triode 1 is connected, by way of a choke and a resistance-condenser circuit for smoothing purposes, to the positive terminal 5 of a source of anode voltage, the negative terminal 6 of which is earthed.

The frequency of the oscillator voltage is stabilized on a component of a frequency spectrum which is given by a pulse-shaped control-oscillation, of which the fundamental frequency may be appreciably lower (say ⅕ to 1/100) than the frequency of the stabilized voltage. For this purpose, the oscillator voltage taken from a coupling condenser 7 is mixed with the control-voltage from a pulse generator 8 in a mixing stage 9 constituted, for example, by a hexode mixer tube, of which the output voltage, which constitutes the A. F. C. control-voltage, is passed through a low-pass filter 10, suppressing the pulse-recurrence freqeuncy. At the output condenser 11 of the filter 10 a control voltage is set up, the value and polarity of which vary with the value and polarity of the required frequency-correction; this control-voltage controls a frequency-correction; this cotnrol-voltage controls a frequency-corrector connected in parallel with the frequency determining oscillatory circuit 2 of the oscillator 1 to 4. The frequency corrector is constituted by a triode 12 which is coupled back wattless by a condenser 13 and of which the anode is connected, by way of a coupling condenser 14, to the upper end of the oscillatory circuit 2.

Varying with the control-voltage comprising direct and alternating voltages, the reactance-tube connection is controlled in such manner that synchronism occurs between the stabilizing component of the control-oscillation and the oscillation produced by the oscillator 1 to 4. Between the two synchronized oscillations a phase-shift remains, however, the value and polarity of which vary with the value and polarity of the frequency correction produced. In the event of synchronism the control-voltage is chiefly a direct voltage.

Owing to the occurrence, in the control-voltage channel, of interference oscillations within the transmission range of the low-pass filter, the synchronism between the oscillations produced by the oscillator 1 to 4 and the stabilizing spectrum component of the control-oscillation is adversely affected. These interference oscillations may, for example, occur if not only the oscillations from the oscillator 1 to 4 and the pulse-generator 8 occur in the mixer stage 9, but also oscillations of different frequency, alternatively due to parasitic coupling between the control-voltage channel and other parts of the apparatus.

Furthermore we have found that, in general, the amplitude of the alternating control-voltage occurring when the oscillator oscillation is not yet stabilized by the control-oscillation materially exceeds the amplitude of alternating interference voltages. It has, for example, been found that with an alternating control-voltage of 6 Vs, the alternating interference voltage amplitude did not exceed 1 V.

In order to reduce the undue influence of these interference oscillations on the oscillator frequency, the control-voltage channel is divided, at the output end of the low-pass filter 10, into two parallel-connected branches, which comprise respectively a low-pass filter 15 having a very small transmission range (for example 5 to 20 c/s) and transmission device which is blocked by a condenser 16 in regard to direct voltages and of which the transmission factor decreases according as the alternating input voltage decreases.

The amplitude-dependent transmission device comprises a theshold device which only transmits the alternating voltages exceeding in amplitude the threshold value given by the threshold device.

The threshold device comprises two anti-parallel-connected diodes 17, 18, the cathode and the anode being directly interconnected on one side, and being interconnected through two equal resistances 20′ and 20″ on the other side. The cathode of the diode 17 is connected through the series-connection of a decoupling circuit constituted by a resistance-condenser circuit and a resistance 19 to the positive terminal 5 of the anode supply and the anode of the diode 18 is connected across a resistance 21 to the negative terminal. In parallel with the diodes is connected a resistance 22, which is connected to the junction of the resistances 20′ and 20″ connected between the cathode of diode 17 and the anode of diode 18.

In the circuit represented negative bias voltages of opposite polarities and determining the threshold value are set up at the diodes, the value of these voltages being determined by the direct voltage set up at the resistances 20′ and 20″. The threshold value is on the one hand preferably higher than the amplitude of the most frequent alternating interference voltages and, on the other hand, smaller than the amplitude of the alternating control-voltages, for example ¼ or ⅕ part thereof.

A particularly simple threshold device is attained with the use of two anti-parallel-connected selenium cells. Naturally, such cells exhibit a threshold value, so that the cells need not be negatively biased.

The alternating control-voltage taken from the output of the threshod device brings about a substantial synchronism between the oscillator wave and the stabilizing spectrum component of the control-oscillation. The synchronisation is produced and maintained by an alternating control-voltage of low frequency occurring through a low-pass filter 15 and by a direct control-voltage. As soon as synchronism is obtained the threshold device alternating interference voltages are materially attenuated or suppressed.

In proportioning the control-cascade it may be taken into account that the "catching range" is reduced i. e. the range in which, with a given tuning of the oscillator, the frequency of the oscillations produced is automatically brought into agreement with a control-frequency different therefrom. A wider "catching range" could, for example, be achieved by widening the transmission range of the control-voltage channel and/or by increasing the mutual conductance of the reactance tube.

The two branches of the control-voltage channel are connected in parallel through a coupling condenser 23 at their output end, the junction being connected to an earthed smoothing condenser 24. The control-voltage taken from the two branches controls, through a resistance 25, the reactance tube 12.

For a satisfactory operation of the A. F. C. device it is important to provide that in the area of the threshold device the amplitude of the alternating voltages, of which the frequency corresponds to or is a harmonic of the pulse recurrence frequency should be lower than the threshold value. For this purpose the low-pass filter 10 is connected before the threshold device in the example shown.

It is to be noted that, instead of using the above described discriminator- and reactance tube-arrangement for stabilizing the oscillator 1 to 4, use may be made of other frequency discriminators comprising frequency correctors.

Furthermore the control-voltages taken from the two branches of the control-voltage channel and comprising direct and alternating voltages may control several frequency-correcting elements of the A. F. C. means, for example a reactance tube connection and a variable reactance controlled by a motor respectively.

Besides the embodiments of the invention referred to above other embodiments are possible.

For example, the transmission device, which is locked in regard to direct voltages, may comprise an amplifier of which the amplification decreases according as the voltage amplitude decreases.

The characteristic feature is that, if stabilisation of the oscillator-frequency is substantially attained, the transmission range of the control-voltage channel, fundamentally decreases materially, or, which comes to the same, the time constant of the control-cascade increases.

What I claim is:

1. An electrical circuit arrangement for the automatic frequency control of a generated oscillation having frequency deviations about a given central frequency, comprising means to generate said oscillation, means to produce a control voltage comprising a direct current component having amplitude variations about a given value proportional to said frequency deviations of said oscillation from said given central frequency and an alternating current component having amplitude variations proportional to said frequency deviations of said oscillation from said given central frequency, control voltage transmission means having a first given transmission factor for said direct current component and a second transmission factor for said alternating current component, said second transmission factor being inversely related to the amplitude of said alternating current component, frequency control means coupled to said oscillation generator, and means comprising said control voltage transmission means to apply said control voltage to said frequency control means thereby to suppress said frequency deviations of said oscillation.

2. An electrical circuit arrangement for the automatic frequency control of a generated oscillation having frequency deviations about a given central frequency, comprising means to generate said oscillation, means to produce a control voltage comprising a direct current component having amplitude variations about a given value proportional to said frequency deviations of said oscillation from said given central frequency and an alternating current component having amplitude variations proportional to said frequency deviations of said oscillation from said given central frequency, first control voltage transmission means comprising a low pass filter and having a first given transmission factor for said direct current component, second control voltage transmission means adapted to prevent transmission of direct current coupled in parallel with said first control voltage transmission means and having a second transmission factor for said alternating current component, said second transmission factor being inversely related to the amplitude of said alternating current component, frequency control means coupled to said oscillation generator, and means comprising said first and second control voltage transmission means to apply said control voltage to said frequency control means thereby to suppress said frequency deviations of said oscillation.

3. An electrical circuit arrangement for the automatic frequency control of a generated oscillation having frequency deviations about a given central frequency, comprising means to generate said oscillation, means to produce a control voltage comprising a direct current component having amplitude variations about a given value proportional to said frequency deviations of said oscillation from said given central frequency and an alternating current component having amplitude variations proportional to said frequency deviations of said oscillation from said given central frequency, first control voltage transmission means comprising a low pass filter and having a first given transmission factor for said direct current component, second control voltage transmission means adapted to prevent transmission of direct current and to prevent transmission of alternating current having an amplitude below a given threshold value, said second control voltage transmission means having a second transmission factor for said alternating current component, said second transmission factor being inversely related to the amplitude of said alternating current component, frequency control means coupled to said oscillation generator, and means comprising said first and second control voltage transmission means to apply said control voltage to said frequency control means thereby to suppress said frequency deviations of said oscillation.

4. An electrical circuit arrangement for the automatic frequency control of a generated oscillation having frequency deviations about a given central frequency, comprising means to generate said oscillation, means to produce a control voltage comprising a direct current component having amplitude variations about a given value proportional to said frequency deviations of said oscillation from said given central frequency and an alternating current component having amplitude variations proportional to said frequency deviations of said oscillation from said given central frequency, first control voltage transmission means comprising a low pass filter having a first given transmission factor for said direct current component, second control voltage transmission means adapted to prevent transmission of direct current and to prevent transmission of alternating current having an amplitude below a given threshold value, said second control voltage transmission means comprising a pair of oppositely poled negatively biased diodes and having a second transmission factor for said alternating current component, said second transmission factor being inversely related to the amplitude of said alternating current component, frequency control means coupled to said oscillation generator, and means comprising said first and second control voltage transmission means to apply said control voltage to said frequency control means thereby to suppress said frequency deviations of said oscillation.

5. An electrical circuit arrangement for the automatic frequency control of a generated oscillation having frequency deviations about a given central frequency, comprising means to generate said oscillation, means to produce a control voltage comprising a direct current component having amplitude variations about a given value proportional to said frequency deviations of said oscillation from said given central frequency and an alternating current component having amplitude variations proportional to said frequency deviations of said oscillation from said given central frequency, said control voltage producing means comprising a source of periodic voltage pulses having a fundamental frequency harmonically related to said given central frequency and means to mix said generated oscillation and said periodic voltage pulses to produce said control voltage, first control voltage transmission means comprising a low pass filter and having a first given transmission factor for said direct current component, second control voltage transmission means adapted to prevent transmission of direct current coupled in parallel with said first control voltage transmission means and having a second transmission factor for said alternating current component, said second transmission factor being inversely related to the amplitude of said alternating current component, frequency control means coupled to said oscillation generator, and means comprising said first and second control voltage transmission means to apply said control voltage to said frequency control means thereby to suppress said frequency deviations of said oscillation.

6. An electrical circuit arrangement for the automatic frequency control of a generated oscilliation having frequency deviations about a given central frequency, comprising means to generate said oscillation, means to produce a control voltage comprising a direct current component having polarity and amplitude variations about a given value proportional to said frequency deviations of said oscillation from said given central frequency, said control voltage producing means comprising a source of periodic voltage pulses having a fundamental frequency harmonically related to said given central frequency and materially lower than said given central frequency, means to mix said generated oscillation and said periodic voltage pulses to produce said control voltage and a first low pass filter adapted to suppress the pulse recurrence frequency of said periodic voltage pulses, first control voltage transmission means comprising a second low pass filter and having a first given transmission factor for said direct current component, second control voltage transmission means adapted to prevent transmission of direct current coupled in parallel with said first control voltage transmission means and having a second transmission factor for said alternating current component, said second transmission factor being inversely related to the amplitude of said alternating current component, frequency control means coupled to said oscillation generator, and means comprising said first and second control voltage transmission means to apply said control voltage to said frequency control means thereby to suppress said frequency deviations of said oscillation.

EDUARD HERMAN HUGENHOLTZ.

REFERENCES CITED

The following references are of record in the file of this patent:

UNITED STATES PATENTS

| Number | Name | Date |
|---|---|---|
| 2,406,309 | Ziegler et al. | Aug. 20, 1946 |